Nov. 10, 1959  G. A. LYON  2,912,279
WHEEL COVER
Filed July 1, 1955  2 Sheets-Sheet 1
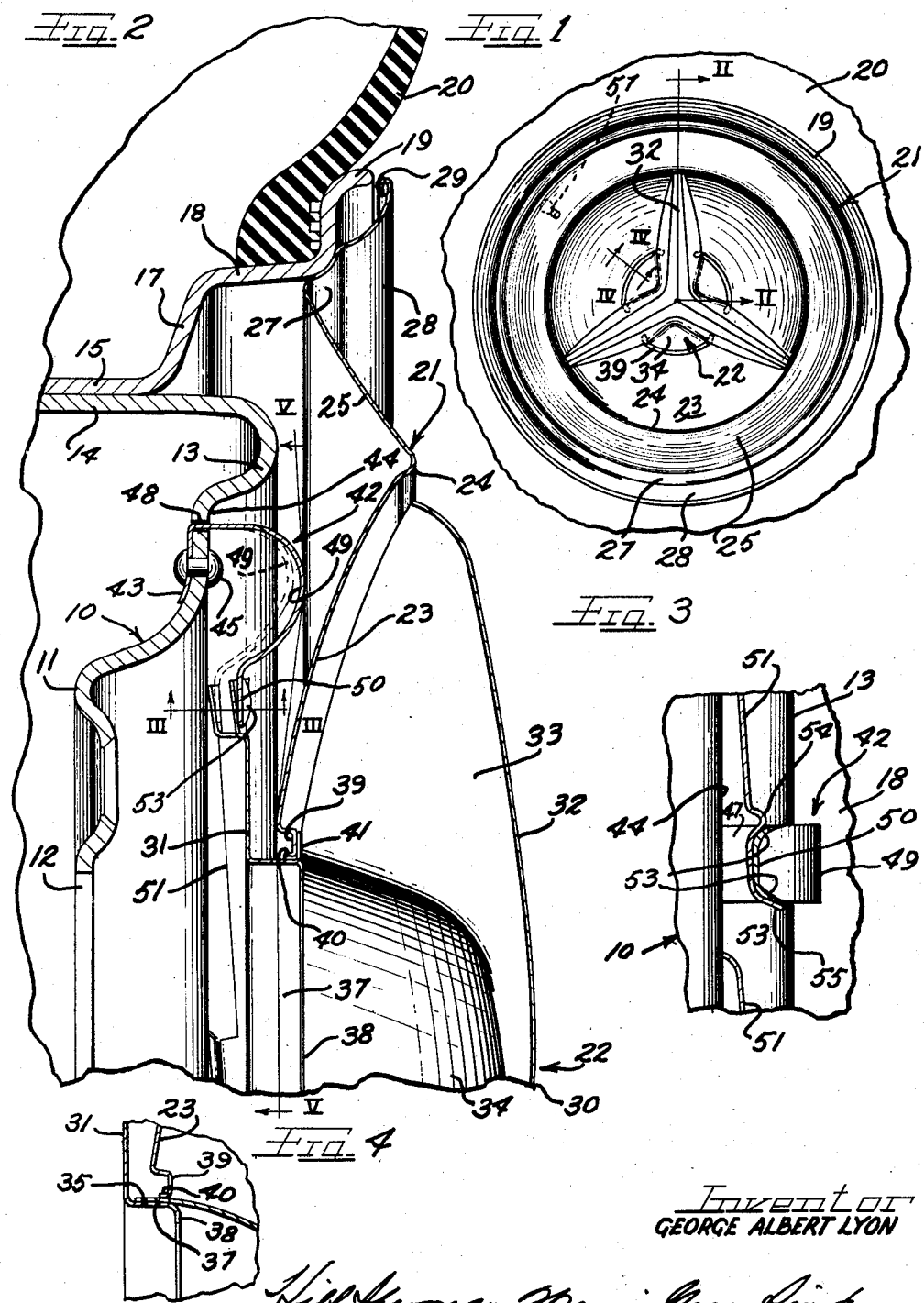
Inventor
GEORGE ALBERT LYON Nov. 10, 1959  G. A. LYON  2,912,279
WHEEL COVER
Filed July 1, 1955  2 Sheets-Sheet 2
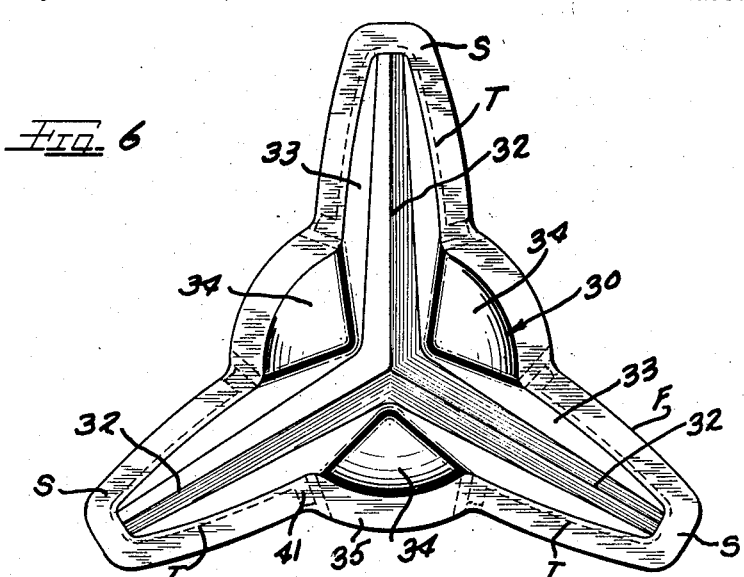
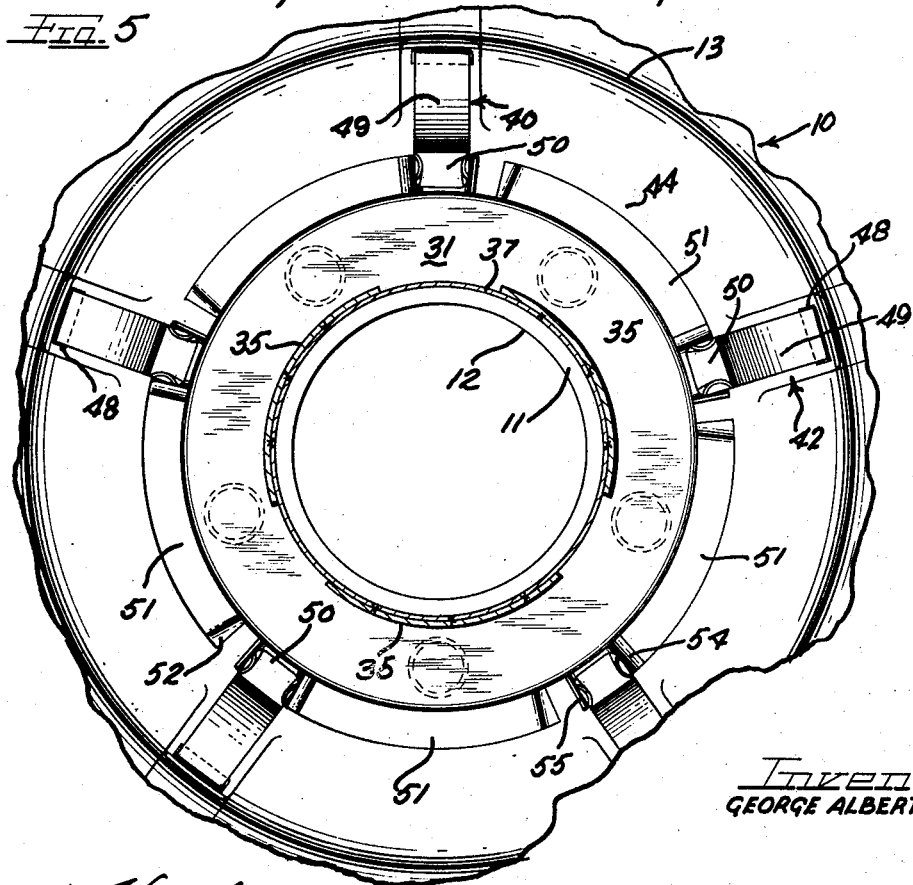
Inventor
GEORGE ALBERT LYON

United States Patent Office 2,912,279
Patented Nov. 10, 1959

2,912,279

WHEEL COVER

George Albert Lyon, Detroit, Mich.

Application July 1, 1955, Serial No. 519,344

14 Claims. (Cl. 301—37)

The present invention relates to improvements in wheel structures and more particularly concerns the ornamental and protective covering of the outer sides of vehicle wheels.

An important object of the present invention is to provide a wheel structure having novel cover means for the outer side thereof with improved retaining structure for the cover.

Another object of the invention is to provide an improved wheel structure having novel cover means for the outer side thereof.

A further object of the invention is to provide an improved wheel structure having novel means for attaching a wheel cover to the outer side thereof in releasable relation.

Still another object of the invention is to provide improved quick detachable means for securing a wheel cover to a wheel.

Yet another object of the invention is to provide improved means in a wheel cover for disposition at the outer side of a vehicle wheel simulating a knock-off type of wheel wherein a rotary attachment member is provided at the outer side of the wheel.

Other objects, features and advantages of the present invention will be readily apparent from the following detailed description of a preferred embodiment thereof taken in conjunction with the accompanying drawings, in which:

Figure 1 is an outer side elevational view of a wheel structure embodying features of the invention.

Figure 2 is an enlarged fragmentary radial sectional view taken substantially on the line II—II of Fig. 1.

Figure 3 is a fragmentary sectional detail view taken substantially on the line III—III of Fig. 2.

Figure 4 is a fragmentary enlarged sectional detail view taken substantially on the line IV—IV of Fig. 1.

Figure 5 is a sectional elevational detail view taken substantially on the line V—V of Fig. 2; and Figure 6 is an elevational view of the central arm cap member of the assembly in a partial stage in its formation.

According to the present invention, a wheel is provided including a disk spider body 10 including a central dished bolt-on flange 11 having a central aperture 12 through which an axle hub structure (not shown) of a vehicle axle to which the wheel may be attached may project. Radially outwardly from the bolt-on flange, the wheel body 10 has a generally axially outwardly bulged annular portion 13 while a generally axially extending outer marginal flange 14 of the wheel body is provided for attachment in suitable manner to a base flange 15 of a multi-flange drop center tire rim.

Extending radially and axially outwardly from the outer side of the base flange 15 is a tire rim side flange 17 which merges with a generally axially outwardly extending and radially outwardly sloping intermediate flange 18 that joins a generally radially outwardly and then axially outwardly turned terminal flange 19. The tire rim is adapted to support a pneumatic tire 20 that may either be a tubeless tire or a tire and tube assembly.

For disposition at the outer side of the wheel in covering and protective relation thereto there is provided herein a wheel cover in the form of a multi-part assembly including a plate member 21 for substantially covering the wheel body and the tire rim, and a central relatively rotatably disposed quick attachment and removal structure 22 which in the detached condition of the cover carries the cover plate 21, or is carried by the cover plate 21 depending upon which of the structures is handled, and which in the assembled relation of the cover with the wheel serves as means whereby the cover is retained on the wheel.

The cover plate 21 is of a diameter to substantially overlie the wheel body 10 and the tire rim. For this purpose the cover member 21 comprises a sheet metal plate made from suitable material such as stainless steel, brass, aluminum or the like, which is stamped or drawn to shape. For overlying the wheel body, the cover plate 21 includes an inwardly dished central portion 23 with an annular axially outwardly extending reinforcing rib or ridge 24 about the dished portion and adapted to overlie the bulge portion 13 of the wheel body. From the rib 24 the cover plate extends generally axially inwardly and radially outwardly to provide an annular dished marginal portion 25 that overlies in assembly the juncture of the tire rim and wheel body and the side flange 17 of the tire rim and has an annular seat 27 engageable in assembly with the wheel upon the shoulder at juncture of the intermediate and terminal flanges. From the seating shoulder 27 the marginal extremity of the cover plate 21 extends generally axially and radially outwardly into spaced relation to the terminal flange to provide a generally rib-like annular marginal portion 28 providing therebehind a chamber within which wheel balancing weights may be accommodated.

At its extremity the annular portion 28 has an underturned reinforcing and finishing bead-like flange 29.

According to the present invention, the central cover structure 22 cooperates with the cover plate 21 to provide at the outer side of the cover plate means whereby the cover structure 22 can be manipulated and means at the inner side of the cover plate 21 to engage with retaining means carried by the wheel. To this end, the central cover structure 22 includes a multi-arm axially outer manipulatable member 30 and attached thereto an attachment plate member 31. Both of the members 30 and 31 are adapted to be made as sheet metal stampings.

In order to afford a decorative as well as utilitarian outer side structure for the cover, the cover member 30 is constructed as a hollow shell cap with radial arm or ears 32 extending from a center to overlie the dished inner portion 23 of the cover plate 21. Side wall flaring flanges 33 of the arms 32 are connected adjacent juncture of the several arms by gusset-like outwardly arched symmetrical cap segments 34 which cooperate to provide a circular cap-like formation from which the arms 32 appear to emanate.

For attachment of the central member 30 to the inner plate member 31, the cap segments 34 are provided with axially inward extending flange extensions 35 which are disposed in a common circle. Telescoped within the flange extensions 35 and secured thereto as by means of welding or the like is an annular axially outwardly extending inner marginal flange 37 of the attachment plate 31. This flange is preferably reinforced by having its outer extremity turned inwardly as at 38. The axial juncture thus provided between the members 30 and 31 extends slidably axially through a central opening in the cover plate 21 defined by an axially outwardly offset annular reinforcing rib-like flange formation 39 provided with an axially inward annular extremity flange 40 which slidably opposes the radially outer sides of the cap member flanges 35 (Fig. 4).

To maintain the outer cap member 30 in predetermined axial disposition relative to the plate 21, the side walls 33 of the arms 32 are adapted to shoulder against the shoulder provided by the rib 39. In order to reduce frictional resistance to turning of the member 30 relative to the plate 21, inturned shoulder flanges 41 are provided as extensions from the inner edge of the side flanges 33 to bear against the shoulder rib (Figs. 1 and 2). The relationship is such that the remainder of the inner edges of the side wall wing flanges 33 are maintained in spaced relation to the opposing dished cover plate portion 23.

Herein the wheel body 10 is provided with a plurality of spring clips 42 (Figs. 2, 3 and 5) which cooperate with the inner retaining plate member 31 for retaining the cover in tensioned engagement with the wheel. To this end, the retaining clips 42 have base portions 43 thereon which engage behind an axially inwardly inset radially inner portion 44 of the nose bulge 13 and are secured thereto as by means of rivets 45. Angular axially outwardly extending resilient clip legs 47 project through appropriate slots 48 in the wheel body portion 44 and are provided with resilient generally axially outwardly and radially inwardly extending loop portions 49. The loop portions 49 extend generally axially inwardly at their inner terminals toward the wheel body and have generally radially inwardly angular terminal heads 50 which are retainingly engageable by radially outer marginal engagement structure on the retaining plate 31.

Herein the retaining structure on the plate 31 comprises a series of similar axially inwardly offset spirally related marginal cam flanges 51 similar in number to the clips 42 and extending radially outwardly and slanted obliquely circumferentially all in the same direction. At their ends disposed axially innermost, the cam flanges 51 have approach ramp or lead-in generally axially inwardly turned extremity portions 52 which are, of course, substantially separated in an axial sense relative to the adjacent axially outermost end portions of the respective companion cam flanges 51. Through this arrangement, when the cover is applied to the outer side of the wheel, by centering the shoulder 27 of the cover plate 21 against the shoulder of the tire rim, the cam flanges 51 will be disposed in position to engage with the retaining head terminal portions 50 of the retaining clips 42 which are normally disposed in an axially inwardly biased position as indicated in dash outline in Fig. 2. Then, as the member 22 is turned by manipulation of the handle arms 32 the clip heads 50 are cammed up the flanges 51 and the clip loops 49 are gradually resiliently deflected axially outwardly and placed under progressively greater tension acting axially inwardly at the clip terminals or heads 50 and thus pressing axially inwardly against the cam flanges 51 and thereby drawing the handle cap member 30 against the flange 39 through the shoulder flanges 41 and placing the cover plate 21 under axially inward resilient tensioned thrust at the shoulder 27 against the shoulder of the tire rim.

In order to facilitate engagement of the clip terminal heads 50 with the cam flanges and to avoid resistance to smooth sliding movement of the heads 50 in engagement with the cam flanges 51, the respective opposite sides of the clip head terminals 50 are preferably turned up to provide side flanges 53.

At the axially outermost terminal portions of the cam flanges 51 means are provided for effecting a latching engagement with the clip head terminals 50. In a simple, convenient construction, such means comprise a detent shoulder hump 54 which may be in the form of a transverse corrugation raised axially outwardly in the surface of the respective cam flange 51 spaced approximately clip width from the axially outermost terminus of the cam flange. Cooperating with the detent shoulder 54 is a stop flange 55 disposed at the adjacent terminus of the cam flange and directed generally axially outwardly to prevent overrunning of the clip heads 50. Thus, in the maximum tensioned, retaining interengagement of the retaining clip heads 50 with the cam flanges 51, the clip heads are cradled between the detent shoulder 54 and the stop flange 55, in each instance. By having the detent shoulder 54 rounded in cross section, it provides sloping sides over which the clip heads 50 can move cammingly with snap-in and snap-out action responsive to manual torsional or turning force applied in the turn-in or turn-out direction, respectively, imparted to the handled central cover member 22.

It will be appreciated that the cover assembly as described affords a convenient arrangement for applying the cover to the wheel and for quickly removing the cover from the wheel. Nevertheless, the cover is securely held on the wheel by the tensioned resilient clips 42 of which there may be five as shown, but of which there may be more or less, depending upon the size and weight of the cover assembly. It may be observed that the cover plate 21 provides a substantial chamber therebehind, especially behind the dished portion 25 thereof within which a valve stem 57 (Fig. 1) can be accommodated in concealed relation. Since it is a simple matter to remove the cover it is easy to get at the valve stem for tire inflation purposes.

Since the armed cap portion 30 of the cover assembly embodies a fairly deeply drawn structure, there is some problem involved in its drawing efficiently. This problem is especially complicated by the provision of the attachment flange extensions from the cap segments 34 and the sliding shoulder flanges 41 that are provided as extensions from the arm side walls 32. To this end, as best seen in Fig. 6, the member 30 is first drawn into the preliminary shell as depicted with the arms 32 substantially drawn to shape and the intermediate cap segments 34 substantially completed, but with a flat lateral flange F about the entire structure providing material from which the attachment flanges 35 and the slider flanges 41 will be derived as depicted in dash outline upon the flange F. The portions of the flange F about the respective arms 32 are then trimmed away along lines T as scrap pieces S, leaving a narrow portion of the flange along the sides and tips of the arms 32 joining the slider tab flanges 41. The narrow side extensions of the flange are then bent into the plane of the side walls 33 and the turned down tips of the arms, and the attachment flanges 35 are bent axially inwardly as extensions from the inner margins of the cap segments 34. This affords finished edges for the arms 32 and places the flanges 35 in position for telescoping interengagement with the inner latching plate flange 37. Then the slider tab flanges 41 are turned under behind the respective arms 32 into a common plane for their sliding seating function.

It will be understood that modifications and variations may be effected without departing from the scope of the novel concepts of the present invention.

I claim as my invention:

1. In a wheel structure including a wheel body having retaining spring clips with generally radially inwardly directed free resilient terminals thereon and a tire rim carried by the body and having a shoulder thereon, a cover for disposition at the outer side of the wheel including a circular cover plate having a shoulder engageable thrustingly with the shoulder of the tire rim, and a rotatable latch at the center of the cover plate having cam flange means behind the cover engageable under resilient tension with the clips by turning the latch structure into engagement with said clip terminals.

2. In a wheel structure including a wheel body having retaining spring clips with generally radially inwardly directed free resilient terminals thereon and a tire rim carried by the body and having a shoulder thereon, a cover for disposition at the outer side of the wheel including a circular cover plate having a shoulder engageable thrustingly with the shoulder of the tire rim, and a rotatable latch at the center of the cover plate having cam flange means behind the cover engageable under resilient tension with the clips by turning the latch structure into engagement with said clip terminals, said cam flange means having interlock detent structure for interengagement with the clip terminals to hold the latch structure against unintentional turning out of retaining engagement with the clips.

3. In a wheel structure including a tire rim and a wheel body having thereon a series of retaining spring clips provided with spring loops and radially inwardly projecting engagement terminal heads, a cover for disposition at the outer side of the wheel including a latch member having generally spiral cam flanges provided with lead-in inturned ends at the axially innermost portions of the flanges and detent shoulders and stop flanges spaced apart at the opposite axially outermost ends of the cam flanges, said cam flanges being engageable with the clip terminal heads to cam the same axially outwardly by turning of the latch member to draw the clip loops into tensioned retaining engagement for thereby drawing the cover axially inwardly toward the wheel.

4. In a cover for disposition at the outer side of a vehicle wheel, a cover plate having a central opening therein, and a rotary latch structure at the center of the cover including an outer handle portion and an inner generally circular latch plate portion connected through said opening and thereby jointly rotatable by manipulation of the handle portion and with the plate portion projecting laterally behind the cover plate and having radially outer marginal spiral cam flanges thereon for retaining engagement with retaining structure on a wheel.

5. In a cover for disposition at the outer side of a vehicle wheel, a cover plate having a central opening therein, and a rotary latch structure at the center of the cover including an outer handle portion and an inner latch plate portion connected through said opening and with the plate portion projecting laterally behind the cover plate and having radially outer marginal spiral cam flanges thereon for retaining engagement with retaining structure on a wheel, said cam flanges having turned down axially inner end portions and turned up stop flanges at the axially outer end portions.

6. In a cover for disposition at the outer side of a vehicle wheel, a cover plate having a central opening therein, and a rotary latch structure at the center of the cover including an outer handle portion and an inner latch plate portion connected through said opening and with the plate portion projecting laterally behind the cover plate and having radially outer marginal spiral cam flanges thereon for retaining engagement with retaining structure on a wheel, said cam flanges having turned down axially inner end portions and turned up stop flanges at the axially outer end portions, said cam flanges having humped interlock shoulders spaced from said stop flanges and adapted to engage a clip terminal therebetween.

7. In a cover for disposition at the outer side of a vehicle wheel, a cover plate having a central opening, a handle shell for disposition at the outer side of the plate, a latch plate for disposition at the inner side of the cover plate, said latch plate and handle shell having telescopically related flanges connected together and extending through said opening for connecting the handle shell and the latch plate together in assembled relation with the cover plate.

8. In a cover for disposition at the outer side of a vehicle wheel, a cover plate having a central opening, a handle shell for disposition at the outer side of the plate, a latch plate for disposition at the inner side of the cover plate, said latch plate and handle shell having telescopically related flanges connected together and extending through said opening for connecting the handle shell and the latch plate together in assembled relation with the cover plate, said cover plate having a dished portion about said opening with an annular axially outwardly projecting rib thereabout and said handle member having a plurality of radially extending arms disposed within the recess defined by said dished portion and inside of said annular rib.

9. In a central rotatable arm cap shell for assembly with a cover plate, a hollow generally circular central cap portion with hollow arms opening thereinto and projecting generally radially therefrom, the central cap portion comprising a plurality of correlated segments between and angular to the juncture portions of the arms, and flange extensions from said segment portions and disposed in a circle for connection to a cooperating circular cover part, said arms having underturned flanges adjacent juncture thereof with said segments and presenting axially inward shoulder surfaces for bearing engagement against a cooperating cover portion.

10. In a wheel structure including a wheel body and a tire rim, the wheel body having thereon resilient cover retaining means including generally U-shaped radially opening spring loops providing resilient legs having one of the legs attached to the wheel body and the other leg overlying the attached leg and projecting radially in axially outwardly spaced relation therefrom and providing resiliently deflectable cover retaining flange structure, and a cover for disposition at the outer side of the wheel including a portion for bottoming against the wheel and another portion engageable with said retaining flange structure and drawing said retaining flange structure axially outwardly to place said spring loops under resilient tension acting through said retaining flange structure to draw the cover under resilient tension axially inwardly toward the wheel and thus effect firm bottoming of said bottoming cover portion against the wheel.

11. In a wheel structure including a wheel body and a tire rim, the wheel body having thereon resilient cover retaining means including generally U-shaped radially opening spring loops providing resilient legs having one of the legs attached to the wheel body and the other leg overlying the attached leg and projecting radially in axially outwardly spaced relation therefrom and providing resiliently deflectable cover retaining flange structure, and a cover for disposition at the outer side of the wheel including a portion for bottoming against the wheel and another portion engageable with said retaining flange structure and drawing said retaining flange structure axially outwardly to place said spring loops under resilient tension acting through said retaining flange structure to draw the cover under resilient tension axially inwardly toward the wheel and thus effect firm bottoming of said bottoming cover portion against the wheel, said retaining flange structure comprising individual radially projecting flange portions of limited width having the sides thereof turned up to facilitate engagement thereof and said engageable cover portion comprising spiral cam flange structure slidably engageable with said retaining flange portions incident to a rotary assembly movement.

12. In a rotatable arm cap shell for assembly with a cover plate, a hollow central cap portion having an axially outer closed side and opening toward the axially inner side thereof and provided with a generally radially facing side wall having hollow arms opening thereinto through the axially inner end of the side wall, said hollow arms opening both axially inwardly and radially inwardly and projecting radially outwardly from the central cap portion side wall, the radially inner ends of the arm side walls being freely separated, the central cap portion side wall comprising a plurality of correlated segments between said radially inner end portions of the arm side walls and connecting together the side walls of adjacent arms, the axially inner portion of the cap shell having means on said arm side walls for interengagement with a companion cover part with which the cap shell is adapted to be used on a wheel.

13. In a cover for disposition over the outer side of a vehicle wheel, a circular cover plate having a central opening therein defined by an annular shoulder facing in one axial direction, a rotary handle and latch structure including a hollow shell handle member opening axially toward said shoulder and provided with radially outwardly projecting hollow arms having side walls provided with turned anti-friction flange means slidably engaging said shoulder, a latch structure on the axially opposite side of said plate from said shoulder, and said handle member having between said arms axially projecting flanges extending through said plate opening and secured corotatively to said latch structure.

14. In a wheel structure including a wheel body having thereon resilient retaining clip structure, a cover of a diameter to overlie the outer side of the wheel including a cover member engageable with the wheel and having a central opening, and a central cover structure including a handle portion disposed at the outer side of said cover member and a latching portion behind the cover member connected through said opening, said latching portion being engageable with said resilient retaining clip structure and thereby drawing the cover toward the wheel so that said cover member bottoms against the wheel.

References Cited in the file of this patent

UNITED STATES PATENTS

| | | |
|---|---|---|
| 2,159,881 | Booth | May 23, 1939 |
| 2,276,405 | Lyon | Mar. 17, 1942 |
| 2,441,008 | Chase | May 4, 1948 |
| 2,680,551 | Brosky | June 8, 1954 |
| 2,727,790 | Gaylord | Dec. 20, 1955 |

FOREIGN PATENTS

| | | |
|---|---|---|
| 265,448 | Italy | June 14, 1929 |
| 360,204 | Great Britain | Nov. 5, 1931 |
| 421,260 | Italy | May 20, 1947 |
| 436,894 | Italy | June 16, 1948 |